US012535527B2

(12) United States Patent
Kim et al.

(10) Patent No.: US 12,535,527 B2
(45) Date of Patent: Jan. 27, 2026

(54) BATTERY DIAGNOSIS METHOD, BATTERY DIAGNOSIS DEVICE, AND BATTERY PACK HAVING THE BATTERY DIAGNOSIS DEVICE

(71) Applicant: SAMSUNG SDI CO., LTD., Yongin-si (KR)

(72) Inventors: Yongchan Kim, Yongin-si (KR); Jaeyoung Lee, Yongin-si (KR); Jeongwon Oh, Yongin-si (KR); Hyewon Kim, Yongin-si (KR); Wonsuk Lee, Yongin-si (KR); Sebastian Szever, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 173 days.

(21) Appl. No.: 18/384,756

(22) Filed: Oct. 27, 2023

(65) Prior Publication Data

US 2024/0159834 A1 May 16, 2024

(30) Foreign Application Priority Data

Nov. 16, 2022 (KR) .................. 10-2022-0153721
Sep. 5, 2023 (KR) .................. 10-2023-0117896

(51) Int. Cl.
*G01R 31/3835* (2019.01)
*G01R 31/392* (2019.01)
*G01R 31/396* (2019.01)

(52) U.S. Cl.
CPC ....... *G01R 31/3835* (2019.01); *G01R 31/392* (2019.01); *G01R 31/396* (2019.01)

(58) Field of Classification Search
CPC . G01R 31/3835; G01R 31/392; G01R 31/396
See application file for complete search history.

(56) References Cited

U.S. PATENT DOCUMENTS

| 2003/0052646 A1 | 3/2003 | Minamiura et al. |
| 2012/0158330 A1* | 6/2012 | Araki ............... H01M 10/48 702/63 |

(Continued)

FOREIGN PATENT DOCUMENTS

| CN | 104166102 A | * 11/2014 |
| CN | 109916987 A | 6/2019 |

(Continued)

OTHER PUBLICATIONS

Extended European Search Report dated Apr. 16, 2024, for corresponding European Patent Application No. 23209036.5.

(Continued)

*Primary Examiner* — Walter L Lindsay, Jr.
*Assistant Examiner* — Milton Gonzalez
(74) *Attorney, Agent, or Firm* — Lee IP Law, P.C.

(57) ABSTRACT

A battery diagnosis method, a battery diagnosis device and a battery pack performing the same. The battery diagnosis device may include a detection device that detects a cell voltage of a battery cell and a diagnosis device. The diagnosis device calculates a rate of voltage decrease over time of the cell voltage if a negligence test of the battery cell is initiated, and detects an inflection point at which the rate of voltage decrease changes from a decreasing trend to an increasing trend. The diagnosis device diagnoses the battery cell as an abnormal battery cell if the inflection point is detected.

13 Claims, 3 Drawing Sheets

(56) References Cited

U.S. PATENT DOCUMENTS

2015/0212162 A1    7/2015   Nakayama et al.
2020/0366117 A1   11/2020   Yamaguchi
2021/0234386 A1    7/2021   Purkayastha et al.

FOREIGN PATENT DOCUMENTS

| CN | 113341329 A | 9/2021 |
|----|----|----|
| CN | 114397582 A | 4/2022 |
| JP | 09-147926 A | 6/1997 |
| JP | 2003-204627 A | 7/2003 |
| JP | 2011-069775 A | 4/2011 |
| JP | 2012-138192 A | 7/2012 |
| JP | 2014-032918 A | 2/2014 |
| JP | 2019-075302 A | 5/2019 |
| WO | WO 2014-016956 A1 | 1/2014 |
| WO | WO 2019-156171 A1 | 8/2019 |
| WO | WO 2022-230104 A1 | 11/2022 |

OTHER PUBLICATIONS

JP Office Action dated Sep. 30, 2024, for corresponding Japanese Patent Application No. 2023-195093.
Japanese Office Action dated Mar. 18, 2025, for corresponding Japanese Patent Application No. 2023-195093.

* cited by examiner

BATTERY DIAGNOSIS METHOD, BATTERY DIAGNOSIS DEVICE, AND BATTERY PACK HAVING THE BATTERY DIAGNOSIS DEVICE

CROSS-REFERENCE TO RELATED APPLICATIONS

Korean Patent Application No. 10-2022-0153721, filed on Nov. 16, 2022, in the Korean Intellectual Property Office, and entitled "BMS WITH INTERNAL SHORT-CIRCUIT DIAGNOSIS LOGIC," and Korean Patent Application No. 10-2023-0117896, filed on Sep. 5, 2023, in the Korean Intellectual Property Office, and entitled "BATTERY DIAGNOSIS METHOD, AND BATTERY DIAGNOSIS DEVICE AND BATTERY PACK PERFORMING THE SAME," are incorporated herein by reference.

BACKGROUND

1. Field

The present disclosure relates to a battery diagnosis method, a battery diagnosis device, and a battery pack having the battery diagnosis device.

2. Description of the Related Art

A secondary battery differs from a primary battery, which only provides irreversible conversion to electrical energy of chemical materials, in that the secondary battery is chargeable and dischargeable repeatedly.

Generally, a secondary battery cell includes an electrode assembly including a positive electrode, a negative electrode, and a separator interposed between the positive electrode and the negative electrode, a case housing the electrode assembly, and electrode terminals electrically connected to the electrode assembly. An electrolyte is injected into the case to enable the charging and discharging of the battery cells through the electrochemical reaction of the positive electrode, the negative electrode, and the electrolyte solution. The shape of the case, such as a cylindrical shape or a rectangular shape, depends on the usage of the battery cells.

In secondary battery cells, the loss of function of the separator may cause an internal short circuit, where the positive electrode and the negative electrode inside the battery cell are short-circuited. The internal short circuit in the secondary battery cell may be caused by deformation due to external impact, metallic foreign substances introduced during a manufacturing process, or the formation of dendrites of lithium or copper due to electrochemical reactions.

The internal short circuit in the secondary battery cell may cause safety issues, such as thermal runaway.

SUMMARY

Embodiments are directed to detecting a battery cell that is expected to experience an internal short circuit.

Some embodiments are directed to a battery diagnosis device including a detection device and a diagnosis device. The detection device is configured to detect a cell voltage of a battery cell. The diagnosis device is configured to calculate a rate of voltage decrease over time of the cell voltage if a negligence test of the battery cell is initiated, to detect an inflection point at which the rate of voltage decrease changes from a decreasing trend to an increasing trend, and to diagnose the battery cell as an abnormal battery cell if the inflection point is detected.

In some embodiments, the diagnosis device may operate in a negligence test mode to perform the negligence test in a state where the battery cell is charged to a State Of Charge (SOC) of a predetermined value or more.

In some embodiments, the predetermined value may be 80%.

In some embodiments, if the inflection point is detected, the diagnosis device may classify the battery cell as an internal short circuit risk group. If the rate of voltage decrease within a time interval after the inflection point satisfies a predetermined condition, the diagnosis device may finally determine the battery cell as the abnormal battery cell.

In some embodiments, the diagnosis device may finally determine the battery cell as an abnormal battery cell if the rate of voltage decrease in the time interval after the inflection point is greater than or equal to than 0.7 millivolt per hour (mV/h).

Some embodiments are directed to a battery pack including the battery diagnosis device; and a battery including at least one of the battery cell.

Some embodiments are directed to a battery diagnosis method of a battery pack. The battery diagnosis method may include entering a negligence test mode of a battery cell; detecting a cell voltage of the battery cell; calculating a rate of voltage decrease over time of the cell voltage; detecting an inflection point at which the rate of voltage decrease changes from a decreasing trend to an increasing trend; and if the inflection point is detected, determining the battery cell as an abnormal battery cell.

Some embodiments include, before entering the negligence test mode, charging the battery cell so that a State of Charge (SOC) of the battery cell is a predetermined value or more.

In some embodiments, the predetermined value may be 80%.

In some embodiments, the determining of the battery cell as the abnormal battery cell may include: if the inflection point is detected, classifying the battery cell into an internal short circuit risk group; and if the rate of voltage decrease within a time interval after the inflection point satisfies a predetermined condition, finally determining the battery cell as an abnormal battery cell.

In some embodiments, the finally determining may include, if the rate of voltage decrease in the time interval after the inflection point is greater than or equal to 0.7 mV/h, finally determining the battery cell as an abnormal battery cell.

According to the present disclosure, it is possible to detect abnormal battery cells that are likely to have internal short circuits through proactive diagnosis, thereby protecting the battery from thermal runaway, ignition, and the like.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Hereinafter, a battery diagnosis method, and a battery diagnosis device and a battery pack having the battery diagnosis device according to embodiments will be described in detail with reference to necessary drawings.

Figure 1:
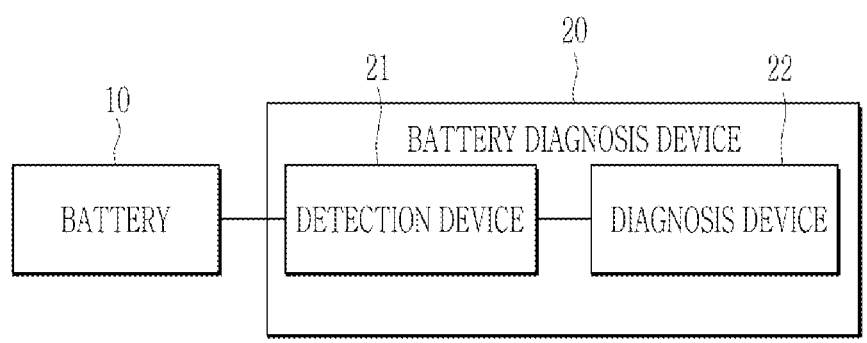
FIG. 1 is a schematic diagram illustrating a battery pack according to an embodiment.

FIG. 1 is a schematic diagram illustrating a battery pack according to an embodiment.

Referring to FIG. 1, a battery pack 1 according to an embodiment may include a battery 10 and a battery diagnosis device 20.

The battery 10 may include at least one battery cell. If the battery 10 includes a plurality of battery cells, the plurality of battery cells may be electrically connected in series and/or parallel with each other.

The battery diagnosis device 20 may continuously detect status information of the battery 10, and based on the status information, diagnose whether the battery 10 is abnormal. The battery diagnosis device 20 may include a detection device 21 and a diagnosis device 22.

The detection device 21 may detect status information of the battery 10, that is, status information (cell voltage, temperature, current, and the like) of the battery cells configuring the battery 10.

The diagnosis device 22 may monitor the status information of the battery cells comprising the battery 10 through the detection device 21 to diagnose whether the battery 10 is abnormal.

Figure 2:
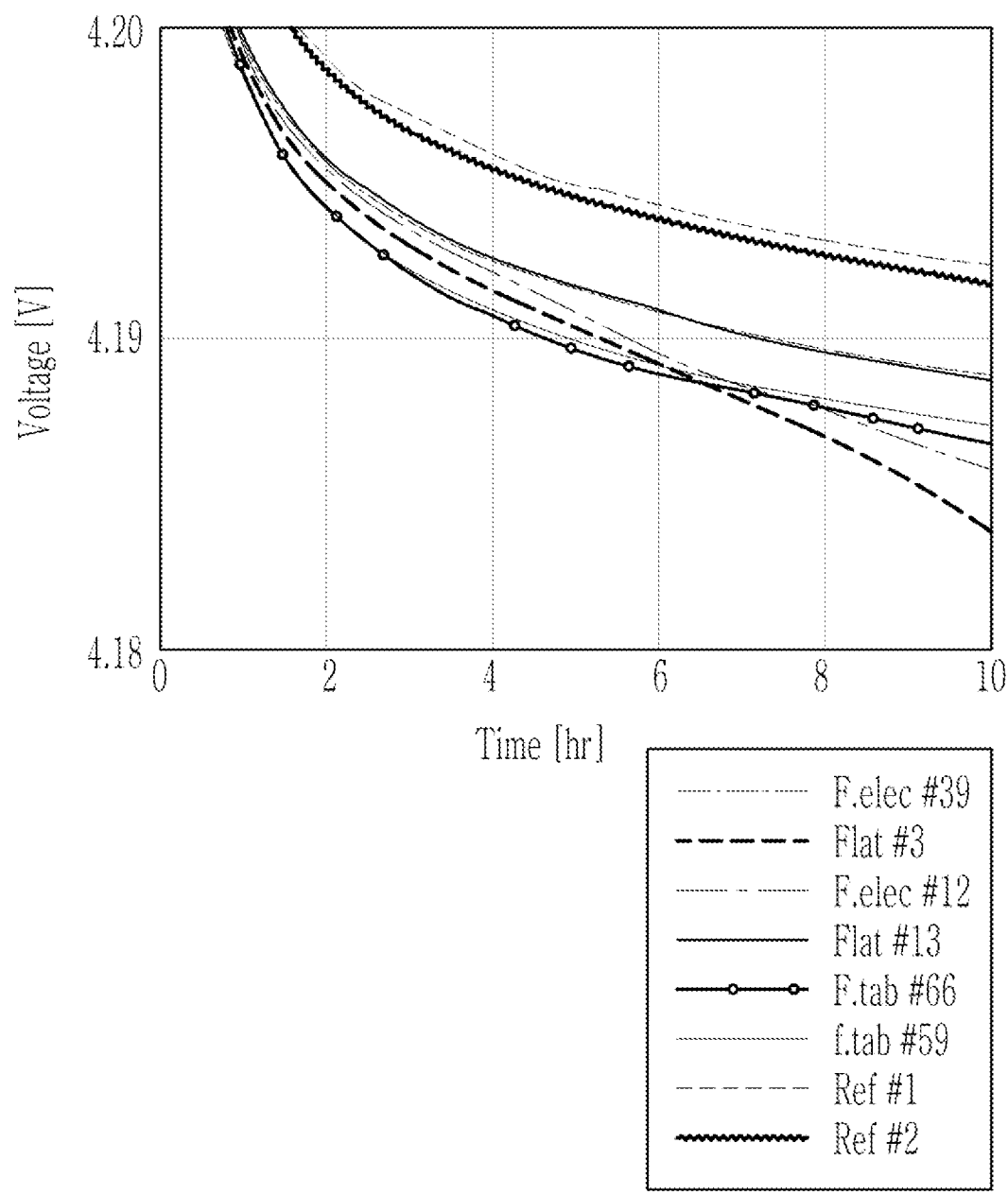
FIG. 2 is a chart illustrating an example of a cell voltage variation of battery cells measured during a negligence test.

Prior to use, the battery pack 1 may be subjected to a negligence test to evaluate its long-term negligence performance. The negligence test may include charging the battery 10 to a predetermined state, then leaving the battery 10 in a rest state for a long period of time without charging or discharging, and monitoring the change in state. For example, the negligence test of the battery 10 may be performed after the battery 10 has been subjected to a charging process until the State Of Charge (SOC) of the battery cells configuring the battery 10 enters a section of 80% or more. FIG. 2 is a chart illustrating an example of the cell voltage change of the battery cells measured during the negligence test, and illustrates the result obtained by leaving the battery cells charged to 100% SOC for 10 hours. In FIG. 2, the battery cells include F.elec #39, Flat #3, F.elec #12, Flat #13, F.tab #66, Nab #59, Ref #1 and Ref #2. Referring to FIG. 2, the battery cell (Flat #3) with the internal short circuit gradually decreases in the rate of cell voltage decrease over time (that is, the amount of cell voltage decrease per unit of time) similar to any other normal battery cell during the initial period of negligence. However, after 6 hours of negligence time, the battery cell (Flat #3) exhibits an abnormal behavior where the rate of cell voltage decrease gradually increases, unlike any other normal battery cell.

The diagnosis device 22 of FIG. 1 may detect the abnormal behavior during the negligence test to detect an abnormal battery cell. To this end, the diagnosis device 22 may continuously obtain the cell voltages of the battery cells configuring the battery 10 through the detection device 21 if the battery 10 enters a negligence test mode. Further, the diagnosis device 22 may monitor the cell voltage changes of the battery cells obtained through the detection device 21 to continuously calculate the rate of cell voltage decrease over time, and detect an inflection point at which the rate of cell voltage decrease over time changes from a decreasing trend to an increasing trend. Here, the decreasing trend of the rate of cell voltage over time indicates a gradual decrease in the amount of cell voltage decrease per unit of time, and the increasing trend of the rate of cell voltage decrease over time indicates a gradual increase in the amount of cell voltage decrease per unit of time.

The diagnosis device 22 may also detect an inflection point by using a second order derivative function (f"( )). Equation 1 below shows an example method of detecting an inflection point by using a second order derivative function.

$$f''(a+h) \times f''(a-h) < 0 \qquad \text{[Equation 1]}$$

In Equation 1 above, f"(a+h) and f"(a−h) represent second order derivative functions and may be calculated by differentiating the cell voltage gradient (dV/dT), which represents the rate of cell voltage change over time. Further, a indicates the amount of time the battery 10 is neglected after entering the negligence test mode, and h may be selected to be a very small value. If an inflection point in the cell voltage gradient (dV/dT) occurs, the sign of the derivative value of the cell voltage gradient (dV/dT) with respect to the inflection point changes. Accordingly, if the inflection point occurs at a time if the battery 10 has been neglected for a period of time a, f"(a+h) and f"(a−h) may have different signs, such that multiplying the two values of f"(a+h) and f"(a−h) together results in a value less than zero. Thus, the diagnosis device 22 may monitor the cell voltage changes of each battery cell, and if a satisfactory point satisfying Equation 1 above is detected, the corresponding point may be determined as an inflection point.

If the inflection point is detected, the diagnosis device 22 may classify the battery cell in which the inflection point is detected as an abnormal battery cell with an internal short circuit.

The diagnosis device 22 may also perform additional diagnosis processes on the battery cell in which the inflection point has occurred, to prevent misdiagnosis of a normal battery cell as an abnormal battery cell. If the inflection point is detected, the diagnosis device 22 may first classify the corresponding battery cell as an internal short circuit risk group. The diagnosis device 22 may then monitor the voltage change after the inflection point for the battery cell classified as the internal short circuit risk group, and if the monitored voltage change satisfies a predetermined condition, the diagnosis device 22 may finally diagnose the corresponding battery cell as an abnormal battery cell. For example, if the rate of voltage decrease (that is, the amount of cell voltage decrease per unit of time) within a time interval after the inflection point occurs is greater than or equal to a threshold (for example, 0.7 mV/h (millivolt per hour)), the diagnosis device 22 may finally diagnose the corresponding battery cell as an abnormal battery cell.

If the diagnosis device 22 detects the abnormal battery cell in the battery 10, the diagnosis device 22 may output the result of the detection through an output device (for example, a display) or transmit the result of the detection to a higher-level system.

The diagnosis device 22 may be implemented to be integrated into a Battery Management System (BMS) (not illustrated) mounted on the battery pack 1.

Figure 3:
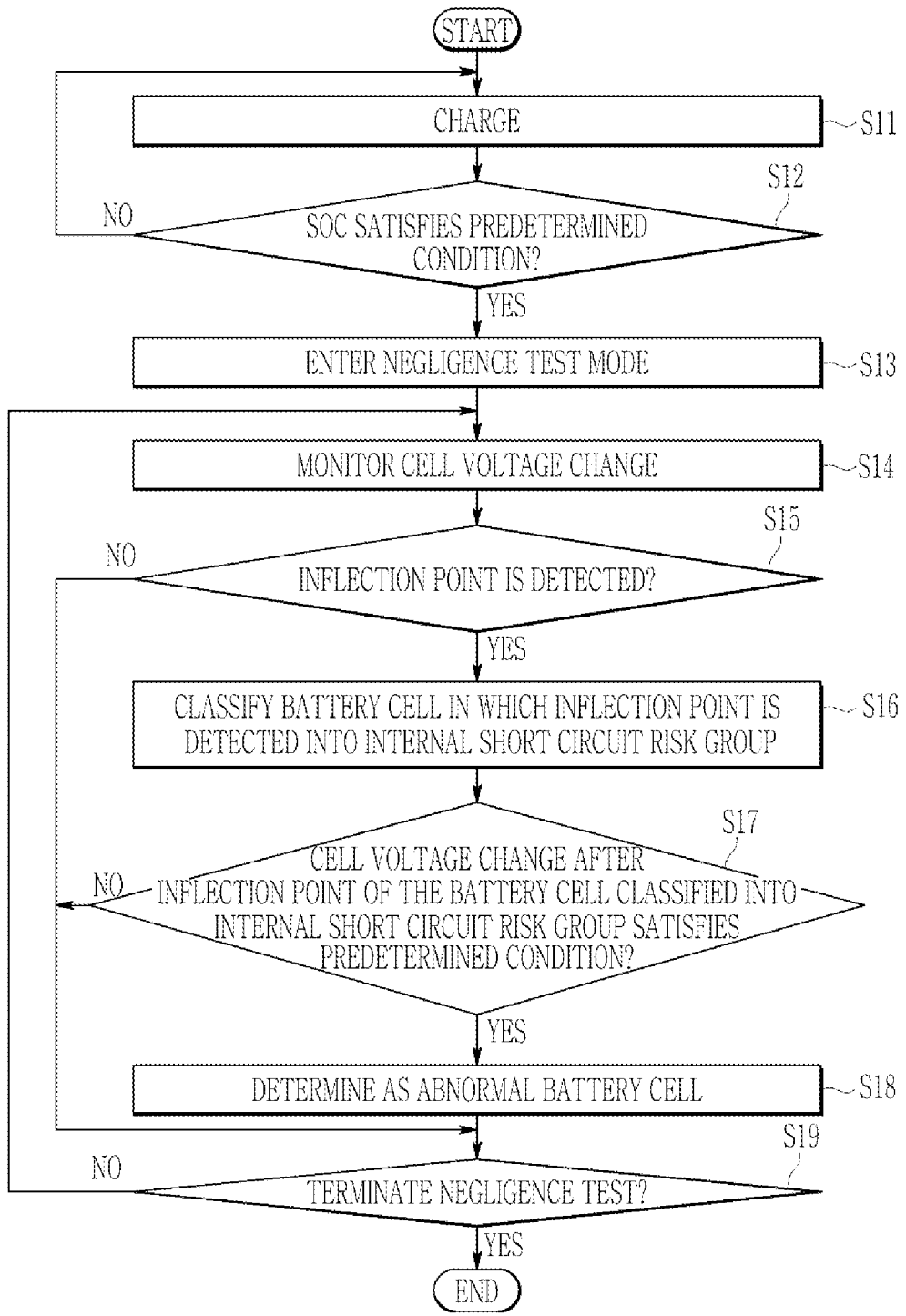
FIG. 3 is a flow chart illustrating a battery diagnosis method according to an embodiment.

FIG. 3 is a flow chart illustrating a battery diagnosis method according to an embodiment.

The battery diagnosis method of FIG. 3 may be performed by a battery diagnosis device 20, appropriately configured and arranged to perform the method, of the battery pack 1 described with reference to FIG. 1.

Referring to FIG. 3, the battery diagnosis device 20 may control the battery 10 to charge until the SOC of the battery cells configuring the battery 10 satisfies a predetermined condition (for example, 80% or greater) in order to proceed with the negligence test (S11 and S12).

If the SOC of the battery 10 satisfies the predetermined condition, the battery diagnosis device 20 may stop charging the battery 10, and subsequently enter a negligence test mode based on a control input received from the outside or the like (S13). While operating in the negligence test mode, the battery diagnosis device 20 may limit the charge and discharge of the battery 10 and maintain the battery 10 in a resting state.

While operating in the negligence test mode, the battery diagnosis device 20 may monitor cell voltage changes in the battery cells to diagnose whether an inflection point has occurred (S14). In other words, the battery diagnosis device 20 may monitor the cell voltage changes of the battery cells and if a rate of the cell voltage decrease of the battery cell over time changes from a decreasing trend to an increasing trend, the battery diagnosis device 20 may detect a corresponding point as an inflection point.

If the inflection point is detected (S15), the battery diagnosis device 20 may classify the battery cell in which the inflection point is detected as an internal short circuit risk group (S16). The battery diagnosis device 20 may then determine whether the cell voltage change after the inflection point of the battery cell classified as the internal short circuit risk group satisfies a predetermined condition (S17), and if the cell voltage change satisfies the predetermined condition, the battery diagnosis device 20 finally determine that the corresponding battery cell is an abnormal battery cell (S18). For example, if the rate of cell voltage decrease of the battery cell classified as the internal short circuit risk group is determined to be greater than or equal to a threshold (for example, 0.7 mV/h) within a time interval after the inflection point, the battery diagnosis device 20 may finally determine the corresponding battery cell as an abnormal battery cell.

The battery diagnosis device 20 may diagnose the abnormal battery cell by repeatedly performing operations S14 to S18 until the termination of the negligence test is determined by a control input received from the outside or the like (S19).

In FIG. 3, operations S16 and S17 are the additionally performed operations and may be omitted to prevent misdiagnosis. For example, if the inflection point is detected through operation S15, the battery diagnosis device 20 may determine the battery cell in which the inflection point is detected as an abnormal battery cell without further diagnosis.

Electronic or electrical devices and/or any other related devices or elements according to the embodiments of the invention described herein may be implemented by using any suitable hardware, firmware (for example, application-specific integrated circuits), software, or a combination of software, firmware, and hardware. For example, the various elements of the devices may be formed on a single Integrated Circuit (IC) chip or on individual IC chips. Further, the various components of these devices may be implemented on flexible printed circuit film, Tape Carrier Package (TCP), Printed Circuit Board (PCB), or a single substrate.

The electrical connections or interconnections described herein may be implemented, for example, by wiring or conductive elements on a PCB or other type of circuit carrier. Conductive elements may include metallization, such as surface metallizations, and/or pins, for example, and may include conductive polymers or ceramics.

Further, the various elements of the devices may be processes or threads that are executed on one or more processors, executed within one or more computing devices, execute computer program instructions, and interact with other system components to perform the various functions described herein. Computer program instructions are stored in the memory, which may be implemented in a computing device by using standard memory devices, for example, Random Access Memory (RAM). The computer program instructions may also be stored in other non-transitory computer-readable media, such as, for example, a CD-ROM, flash drive, or the like.

Further, those skilled in the art should recognize that the functionality of various computing devices may be combined or integrated into a single computing device, or that the functionality of a particular computing device may be distributed across one or more other computing devices without departing from the scope of the embodiments of the present disclosure.

Like reference numerals refer to like elements throughout.

As used herein, the term "and/or" includes any and all combinations of one or more of the associated and enumerated items. In addition, the use of "may" when describing embodiments of the present disclosure means "one or more embodiments of the present disclosure."

In the description of embodiments of the present disclosure, terms in the singular form may include plural forms unless the context clearly indicates otherwise.

Terms including ordinal numbers, such as "first", "second", and "third" may be used to describe various elements, but it will be understood that the elements should not be limited by these terms. This term may be used only to distinguish one element from another. For example, a first element may be named a second element, and likewise, a second element may be named a first element, without departing from the scope of the present disclosure. As used herein, the term "and/or" includes any and all combinations of one or more of the relevant and enumerated items. An expression, such as "at least one", preceded by a list of elements, modifies the entire list of elements and does not modify individual elements in the list.

As used herein, the terms "substantially," "about," and similar terms are used as terms of approximation and not as terms of degree, and are intended to describe inherent deviations from a measured or calculated value that would be recognized by those skilled in the art. In addition, when the term "substantially" is used in combination with a feature that can be expressed using a number, the term "substantially" refers to a range of +/−5% of the value centered on that number.

Where one element is described as being "on", "connected to", or "coupled" to another element, "on", "connected to", and "coupled" include both being formed directly and by the interposition of one or more other elements. In addition, when an element is described as being "between" two elements, it should be understood that it is the only element between the two elements, or that there are one or more other intervening elements.

Connecting two elements electrically includes not only direct connections between the two elements, but also connections between the two elements through other elements.

Other elements may include a switch, a resistor, a capacitor, and the like. In describing the embodiments, the term "connect" means to connect electrically, unless the term "direct connection" is used.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery diagnosis device, comprising:
a detection device configured to detect a cell voltage of a battery cell; and
a diagnosis device configured to calculate a rate of voltage decrease over time of the cell voltage if a negligence test of the battery cell is initiated, to detect an inflection point at which the rate of voltage decrease changes from a decreasing trend to an increasing trend, and to diagnose the battery cell as an abnormal battery cell if the inflection point is detected, wherein the diagnosis device is further configured to classify the battery cell as an internal short circuit risk group if the inflection point is detected, and to finally determine the battery cell as the abnormal battery cell if the rate of voltage decrease within a time interval after the inflection point satisfies a predetermined condition.

2. The battery diagnosis device as claimed in claim 1, wherein the diagnosis device is further configured to operate in a negligence test mode to perform the negligence test in a state where the battery cell is charged to a State Of Charge (SOC) of a predetermined value or more.

3. The battery diagnosis device as claimed in claim 2, wherein the predetermined value is 80%.

4. The battery diagnosis device as claimed in claim 1, wherein the diagnosis device is further configured to finally determine the battery cell as the abnormal battery cell if the rate of voltage decrease in the time interval after the inflection point is greater than or equal to 0.7 millivolt per hour (mV/h).

5. A battery pack, comprising:
the battery diagnosis device as claimed in claim 1; and
a battery including at least one of the battery cell.

6. The battery pack as claimed in claim 5, wherein the diagnosis device is further configured to operate in a negligence test mode to perform the negligence test in a state where the battery cell is charged to a State Of Charge (SOC) of a predetermined value or more.

7. The battery pack as claimed in claim 6, wherein the predetermined value is 80%.

8. The battery pack as claimed in claim 5, wherein the diagnosis device is further configured to classify the battery cell as an internal short circuit risk group if the inflection point is detected, and to finally determine the battery cell as the abnormal battery cell if the rate of voltage decrease within a time interval after the inflection point satisfies a predetermined condition.

9. The battery pack as claimed in claim 8, wherein the diagnosis device is further configured to finally determine the battery cell as the abnormal battery cell if the rate of voltage decrease in the time interval after the inflection point is greater than or equal to 0.7 millivolt per hour (mV/h).

10. A battery diagnosis method of a battery pack, the battery diagnosis method comprising:
entering a negligence test mode of a battery cell;
detecting a cell voltage of the battery cell;
calculating a rate of voltage decrease over time of the cell voltage;
detecting an inflection point at which the rate of voltage decrease changes from a decreasing trend to an increasing trend; and
if the inflection point is detected, determining the battery cell as an abnormal battery cell, wherein:
the determining of the battery cell as the abnormal battery cell includes:
if the inflection point is detected, classifying the battery cell into an internal short circuit risk group; and
if the rate of voltage decrease within a time interval after the inflection point satisfies a predetermined condition, finally determining the battery cell as the abnormal battery cell.

11. The battery diagnosis method as claimed in claim 10, further comprising before entering the negligence test mode, charging the battery cell so that a state of charge (SOC) of the battery cell is a predetermined value or more.

12. The battery diagnosis method as claimed in claim 11, wherein the predetermined value is 80%.

13. The battery diagnosis method as claimed in claim 10, wherein the finally determining includes, if the rate of voltage decrease in the time interval after the inflection point is greater than or equal to 0.7 millivolt per hour (mV/h), finally determining the battery cell as the abnormal battery cell.

* * * * *